July 30, 1940. W. H. DEW 2,209,689
GASOLINE METERING MECHANISM FOR TRUCKS PROVIDED WITH POWER TAKE-OFFS
Filed Dec. 19, 1939 2 Sheets-Sheet 1
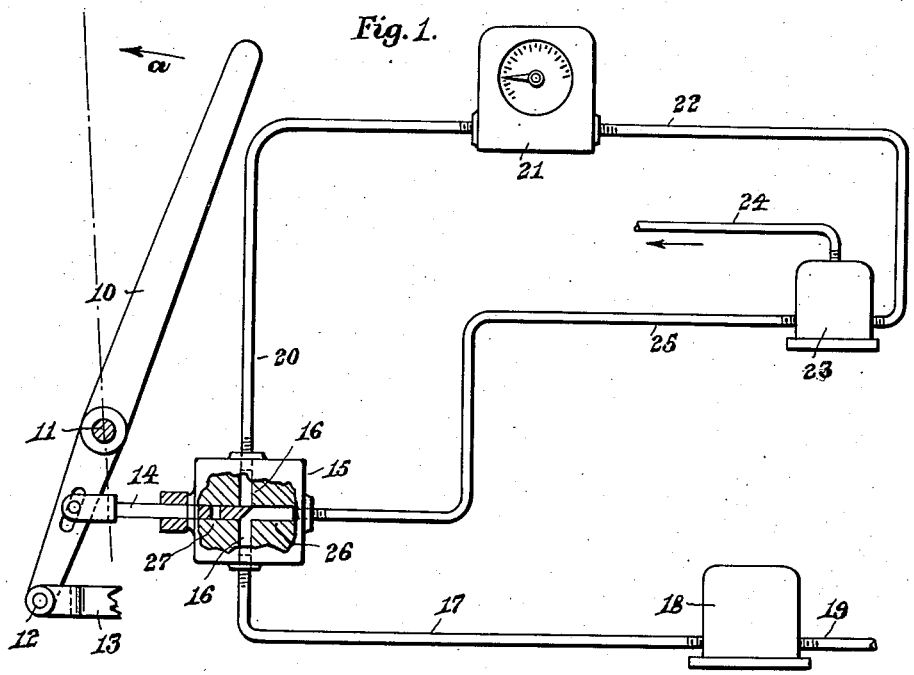
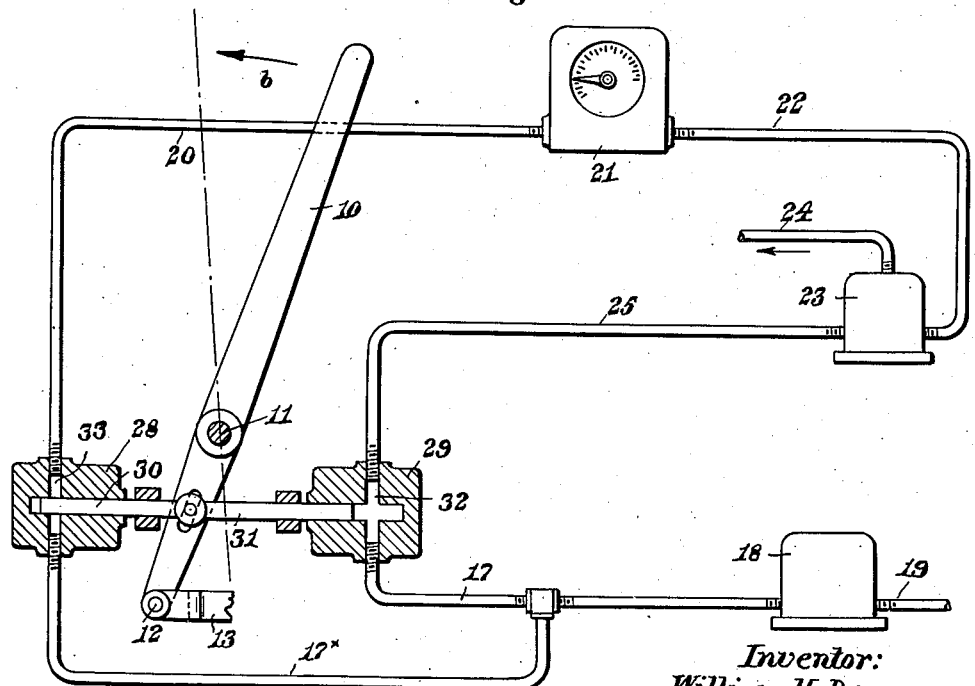
Inventor:
William H. Dew,
by Walter E. Lombard.
Atty,

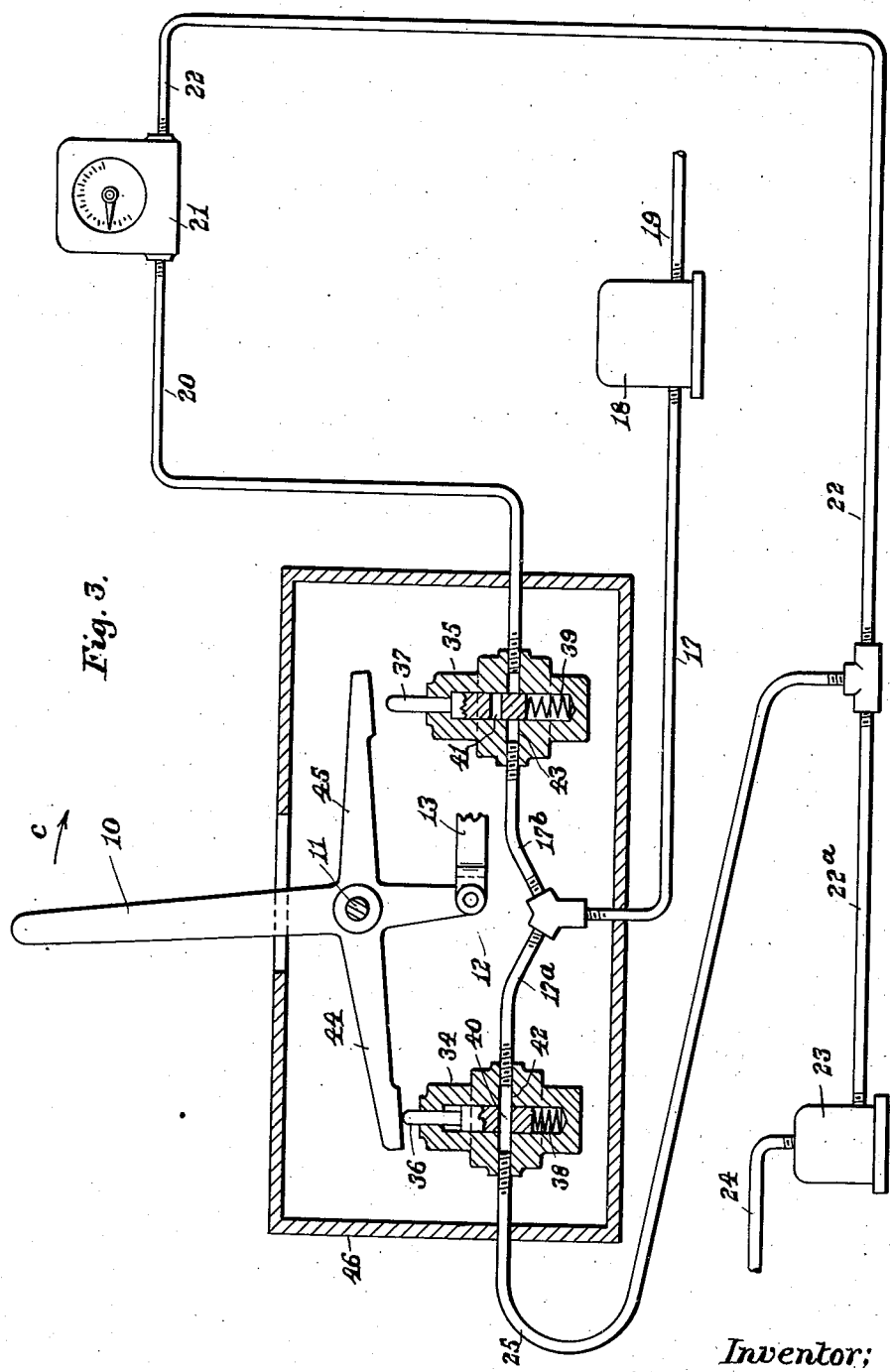

Patented July 30, 1940

2,209,689

UNITED STATES PATENT OFFICE 2,209,689

GASOLINE METERING MECHANISM FOR TRUCKS PROVIDED WITH POWER TAKE-OFFS

William H. Dew, Waltham, Mass.

Application December 19, 1939, Serial No. 310,001

3 Claims. (Cl. 221—95)

The present invention relates to means for metering gasoline used on an oil truck or similar vehicle provided with a power take-off, while said truck is at a standstill and not traveling over a road.

In order to maintain the roads already built and provide for new roads, most States have established a fund for this purpose by taxing the owners of all motor vehicles on every gallon purchased for use while the vehicles are traveling over the roads, while gasoline purchased for any other purpose is not taxable.

Some vehicles such as large oil trucks use a great quantity of gasoline while operating a pump to fill or empty the oil tanks thereon, and as the trucks during these operations are at a standstill the gasoline used in his manner is non-taxable. The same is true of other types of trucks, as for instance, hoist body trucks.

As a consequence, it is highly desirable to determine accurately the quantity of gasoline used for any purpose while the trucks are not in motion on the road.

All gasoline purchased for use on a truck must be paid for in full but if the tax officials can be shown by accurate meter reports the exact quantity of gasoline used for other purposes a rebate may be obtained on the tax already paid.

To this end the main object of the invention is to provide means operable by the usual power-take-off-lever for diverting the gasoline from the pump through a meter when the truck is at a standstill and cut out said meter when the truck is ready for movement over the road and the gasoline is being pumped directly to the vehicle motor. In other words, the meter is only in use when power is not being transmitted to the driving mechanism of the vehicle, there being no object in metering the gasoline used when the vehicle driving mechanism is in operation as no rebate is obtainable on gasoline used while the vehicle is being driven over the road.

This object is attained by the instrumentalities shown in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents, in diagram, a mechanism embodying the principles of the present invention.

Figure 2 represents, in diagram, a modified form of said mechanism, and

Figure 3 represents, in diagram, another modified form of said mechanism.

Similar characters indicate like parts throughout the several figures of the drawings.

In the drawings, 10 is a power take-off lever of usual construction such as oil trucks and similar vehicles are equipped with, this lever being pivoted at 11 and having pivotally connected to its lower end, at 12, a rod or bar 13 by which a clutch mechanism is actuated to connect the driving mechanism to the vehicle motor, or disconnect the motor from said driving mechanism.

As this clutch operating mechanism is of usual construction and forms no part of the present invention, it is deemed unnecessary to illustrate the same.

Connected to the lower end of the lever 10 is a plunger 14 of a three-way valve 15 as shown in Fig. 1 of the drawings.

This valve 15 has a passage 16 extending therethrough and from one end of this passage is a pipe 17 connected at its opposite end to a pump 18, said pump having a pipe 19 leading thereto from a gasoline supply.

The opposite end of the passage 16 has a pipe 20 leading therefrom to a meter 21 which may be of any usual construction.

From the meter 21 extends another pipe 22 leading to a carburetor 23.

This carburetor has a pipe 24 extending therefrom to the vehicle motor and also has another pipe 25 leading therefrom to the passage 26 in the valve 15.

The plunger 14 has a transverse opening 27 therein which is adapted to be brought into alinement with the passage 16 when the lever 10 is moved in the direction of the arrow a on Fig. 1 of the drawings.

As shown in the drawings, the passage 16 is closed and the passage 26 is open so that during the operation of the pump 18 gasoline may be forced through the passage 26, pipe 25, to the carburetor 23, and from said carburetor through the pipe 24 to the vehicle motor.

This would be the condition of the valve mechanism when the truck is in movement over a road.

When, however, the truck or other vehicle is brought to a standstill and it is desired to fill an oil tank on said truck, or to perform some other operation by devices driven from the vehicle motor, the lever 10 is moved in the direction of the arrow a on Fig. 1 of the drawings a sufficient distance to bring the opening 27 and passage 16 into alinement, thus permitting the gasoline from the pump 18 to pass through the pipe 20, meter 21, pipe 22, carburetor 23, and pipe 24 leading to the vehicle motor.

It will be obvious, therefore, that when the vehicle is in motion the gasoline will be delivered to the vehicle motor without passing through the meter 21.

When, on the other hand, the truck is at a standstill and it is necessary to perform some work using the power of the vehicle motor, the meter 21 will be brought into operation and accurately measure all gasoline used while this work is being performed.

This meter will give an accurate reading of the exact amount of gasoline which is used when the vehicle motor is performing some work while the vehicle is at a standstill.

The various readings of the meter after various works have been accomplished by the vehicle motor are added together, verified and presented to the tax officials so that a rebate may be obtained on the amount of gasoline used in these various operations, which gasoline thus used is non-taxable.

In heavy oil trucks, for instance, the amount of gasoline used in this manner amounts to considerable and the tax thereon is well worth saving. This rebate, however, can not be obtained unless the amount of gasoline used in these operations is accurately metered and this may be accomplished readily by the mechanism illustrated in the drawings.

The modification shown in Fig. 2 of the drawings operates in precisely the same manner with the exception that two valves 28, 29 are used with alined plungers 30, 31 therein pivotally connected to the power take-off lever 10 which is disposed between said valves 28, 29.

As shown in Fig. 2, the passage 32 in the valve 29 is open permitting gasoline to be pumped therethrough to the carburetor 23 through the pipe 25 and from the carburetor through the pipe 24, to the vehicle motor.

By moving the lever 10 in the direction of the arrow b on Fig. 2 of the drawings, the passage 32 may be closed by the plunger 31 and the passage 33 will be opened permitting the gasoline to be pumped therethrough from pipe 17x to the meter 21 through pipe 20 and from the meter 21 through pipe 22 to the carburetor 23 and from this carburetor through the pipe 24 to the vehicle motor.

In the modification shown in Fig. 3 two valves 34, 35 are used having plungers 36, 37 therein normally retained in raised position by means of the springs 38, 39.

These plungers have passages 40, 41 extending therethrough adapted to be alined with the passages 42, 43 in the valve bodies 34, 35.

The lever 10 in this case is provided with laterally extending arms 44, 45 which in the movement of the lever 10 about its pivot are adapted to coact with the plungers 36, 37 and press said plungers downwardly against the tension of the springs 38, 39.

As shown in Fig. 3 of the drawings the arm 44 has depressed the plunger 36 so that the passage 40 is in alinement with the passage 42 and when in this position the gasoline from the pump 18 passes through the pipe 17 and the branch pipe 17x, through the passages 42, 40, then through the pipe 25 and pipe 22a into the carburetor 23, and from said carburetor through the pipe 24 to the vehicle motor.

When the lever 10 is moved sufficiently in the direction of arrow c on Fig. 3, the arm 45 is adapted to depress the plunger 37 and bring the passages 41, 43 in alinement and in so doing permit the gasoline to be pumped through the pipe 17, branch pipe 17b, through the valve 35, pipe 20 to meter 21, and from said meter 21 through the pipes 22 and 22a to the carburetor 23, and from the said carburetor through the pipe 24 to the vehicle motor.

Preferably the valve mechanism may be disposed in an enclosure 46 which may be locked in such a manner as to prevent the mechanism being tampered with.

It has been found in practice that a great saving in the tax on gasoline may be made by the installation on heavy trucks of the mechanism shown and described therein.

It is believed the operation and many advantages of the invention will be fully understood without further description.

Having thus described my invention, I claim:

1. In a mechanism of the class described, a manually actuated power take-off lever adapted to cut off the transmission of power from a vehicle motor to the driving mechanism of said vehicle, a meter, valve mechanism operable by the movement of said lever to permit the passage of gasoline either directly to the vehicle motor or indirectly to said motor through said meter when the running gear of the vehicle is not in operation, a gasoline pump, and a pipe therefrom to said valve mechanism.

2. In a mechanism as set forth in claim 1, in which a carburetor is provided through which gasoline passes to the vehicle motor directly from the pump or indirectly from said meter.

3. In a mechanism of the class described, a manually actuated power take-off lever adapted when moved in one direction to cut off the transmission of power from a vehicle motor to the driving mechanism of said vehicle, a meter, a valve having an inlet and two outlets therefrom, a carburetor, a gasoline pump, a pipe leading from said pump to the inlet of said valve, a pipe leading from one of the valve outlets to said carburetor, a pipe leading from the other of said valve outlets through a meter to said carburetor, a pipe leading from said carburetor to the vehicle motor, and a plunger in said valve pivotally connected to said power take-off lever normally closing the outlet to the meter and movable by said power take-off lever into a posittion to open the outlet to the meter and close the outlet to the carburetor.

WILLIAM H. DEW.